_____

United States Patent Office 3,579,633
Patented May 18, 1971

_____

3,579,633
MULTIPLE CLOSTRIDIAL ANTIGEN VACCINE FOR ANIMALS
Robert Orrock Thomson, London, England, assignor to Burroughs Wellcome & Co (U.S.A.) Inc., Tuckahoe, N.Y.
No Drawing. Continuation of application Ser. No. 536,606, Mar. 23, 1966. This application Jan. 14, 1969, Ser. No. 791,186
Claims priority, application Great Britain, Mar. 25, 1965, 12,726/65
Int. Cl. A61k *23/00;* C12k *5/00*
U.S. Cl. 424—92
12 Claims

ABSTRACT OF THE DISCLOSURE

An injectable vaccine preparation comprising aqueous antigenic material derived from at least two pathogenic costridium species, a mineral oil, lipophilic emulsifier and a hydrophilic emulsifier, the preparation being a stable, parenterally acceptable emulsion of an aqueous antigenic phase dispersed in a continuous oil phase, wherein the aqueous phase comprises from 10 to 35% of the volume of the preparation.

_____

This application is a continuation of my co-pending application Ser. No. 536,606 filed Mar. 23, 1966, now abandoned.

This invention relates to biologically active material and especially to vaccines and their preparation.

Many animals are susceptible to diseases arising out of infections of pathogenic members of the genus Clostridium. Adult sheep and lambs are particularly susceptible to many of these diseases and in particular to those caused by strains of the species *Clostridium perfringens*. These organisms proliferate in the gut and produce toxins which give rise to the symptoms and pathological changes symptomatic of the disease, and may lead to death of the animal. Thus the $\beta$- and $\epsilon$-toxins of *Cl. perfringens* Type B give rise to lamb dysentery, and the $\epsilon$-toxin of *Cl. perfringens* Type D gives rise to pulpy kidney disease in lambs. Similarly enterotoxaemia, or "struck" as it is often called in adult sheep, is caused by the $\beta$-toxin of *Cl. perfringens* Type C.

In addition to being susceptible to the diseases described above sheep and other animals, for example cattle, are also susceptible to other clostridial diseases. Thus, sheep and cattle are susceptible to infection by *Cl. septicum* which gives rise to the disease Braxy in sheep and sometimes Blackleg in cattle, and is also in part responsible for symptoms similar to those of gas gangrene. Another common clostridial infection is Black disease which occurs in sheep and occasionally in cattle and is caused by *Cl. oedematiens* Type B. The same organism can also infect body wounds leading to a gas gangrene infection. The well-known disease, tetanus, in sheep and cattle is also caused by a clostridial organism, *Cl. tetani;* and a further disease of widespread occurrence in cattle and of less frequency in sheep is Blackleg caused by *Cl. chauvoei*.

One method of protecting against these diseases is to vaccinate the animals with a toxoid derived from the causative organisms, and in the case of *Cl. chauvoei* to vaccinate with an anaculture of the organism. Subcutaneous injection with a toxoid or anaculture as appropriate produces the desired antibody response protecting the animal against the disease. The response evoked following injection of a simple toxoid or anaculture can be substantially increased by including adjuvants in the vaccine which, by a mechanism not fully understood, produce a greater antibody response and hence a greater degree of protection. Adjuvants which have found wide acceptance are aluminium adsorbents, and these owe at least some of their effectiveness to their ability to adsorb and retain the antigen at the site of injection.

Common use of aluminium adjuvants has materially reduced the number of injections necessary to protect against clostridial diseases by enhancing the antibody response to such a degree that vaccines may be combined together into a single vaccine. The preparation of such multicomponent vaccines was not feasible until the immunogenic value of each constituent could be increased sufficiently to permit its dilution by the other components. When it is necessary to vaccinate large numbers of animals there is a considerable decrease in expense and labour by administering a multicomponent vaccine in place of separate injections of the individual constituent vaccines. This is particularly so when large numbers of animals spread over large areas have to be sought or rounded up for vaccination.

Nevertheless the use of aluminum adjuvenated clostridial vaccines have their drawbacks. Subcutaneous injection of the vaccines frequently lead to local reaction at the site of injection, and the high immune response does not absolve the farmer of providing further booster doses of the vaccine. Thus after sheep have been vaccinated against these diseases, a further injection of the same adjuvenated vaccine is required about 4 to 6 weeks later and subsequently at intervals of about 6 months to maintain the required level of immunity. Vaccination prior to lambing is needed so that the pregnant ewe can passively transfer to the lambs via the colostrum the material antibodies to protect the lambs against pulpy kidney, tetanus and lamb dysentery in the days following birth.

In attempts to obtain an even higher degree and a longer duration of immunity, other means of enhancing the antigenicity of vaccines of water-in-oil emulsions for promoting antibody response have been extensively investigated in recent years. In a classical Freund-type water-in-oil emulsion the antigen is present in an aqueous phase dispersed in a continuous oil phase containing a lipophilic or oil soluble emulsifier to promote emulsification. Using such an emulsifying system it has been possible to obtain a high degree of immunity. However, this type of emulsion has not found acceptance because of a variety of reasons including the instability of the emulsion and extensive local reaction often produced upon subcutaneous injection into the animal.

According to present invention there is provided an injectable vaccine preparation comprising aqueous antigenic material derived from at least two pathogenic clostridium species, a mineral oil, a lipophilic emulsifier and a hydrophilic emulsifier, the preparation being a parenterally acceptable stable emulsion of an aqueous antigenic phase dispersed in a continuous oil phase, wherein the aqueous phase comprises from 10 to 35% by volume of the preparation.

Vaccines of the present invention have been found to provide a considerably higher antibody response obtained from a comparable vaccine containing only a lipophilic emulsifier. The immunity obtained from a vaccine of the present invention also extends for a longer period than the immunity provided by hitherto known comparable water-in-oil emulsion vaccines, so that the need for further doses to maintain an adequate level of immunity is substantially diminished. For example, a sheep immunised with a vaccine of the present invention does not require a further injection until 6 or 9 months later, and thereafter, one injection every one or two years is sufficient to maintain an adequate antibody level. The antibody level in the colostrum is also substantially higher than the level obtained with aluminium vaccines. Vaccines of the present invention are also substantially more stable than comparable antigen. The aqueous phase does not exceed 35% and does not fall below 10% of the total volume of the emulsion. A greater proportion of water is undesirable because of the increase in viscosity and instability of the emulsion, and a proportion of less than 10% makes it difficult to incorporate sufficient antigen without having an unacceptably large dose volume. It has been found that satisfactory vaccines are obtained when the aqueous phase comprises from 20 to 35% by volume of the whole vaccine. It has been found that such emulsions containing polyoxyethylene (20) sorbitan trioleate, may be stabilised by the addition of Falba—a stabiliser containing beeswax, paraffin oils of various viscosities and oxycholesterins extracted from lanolin.

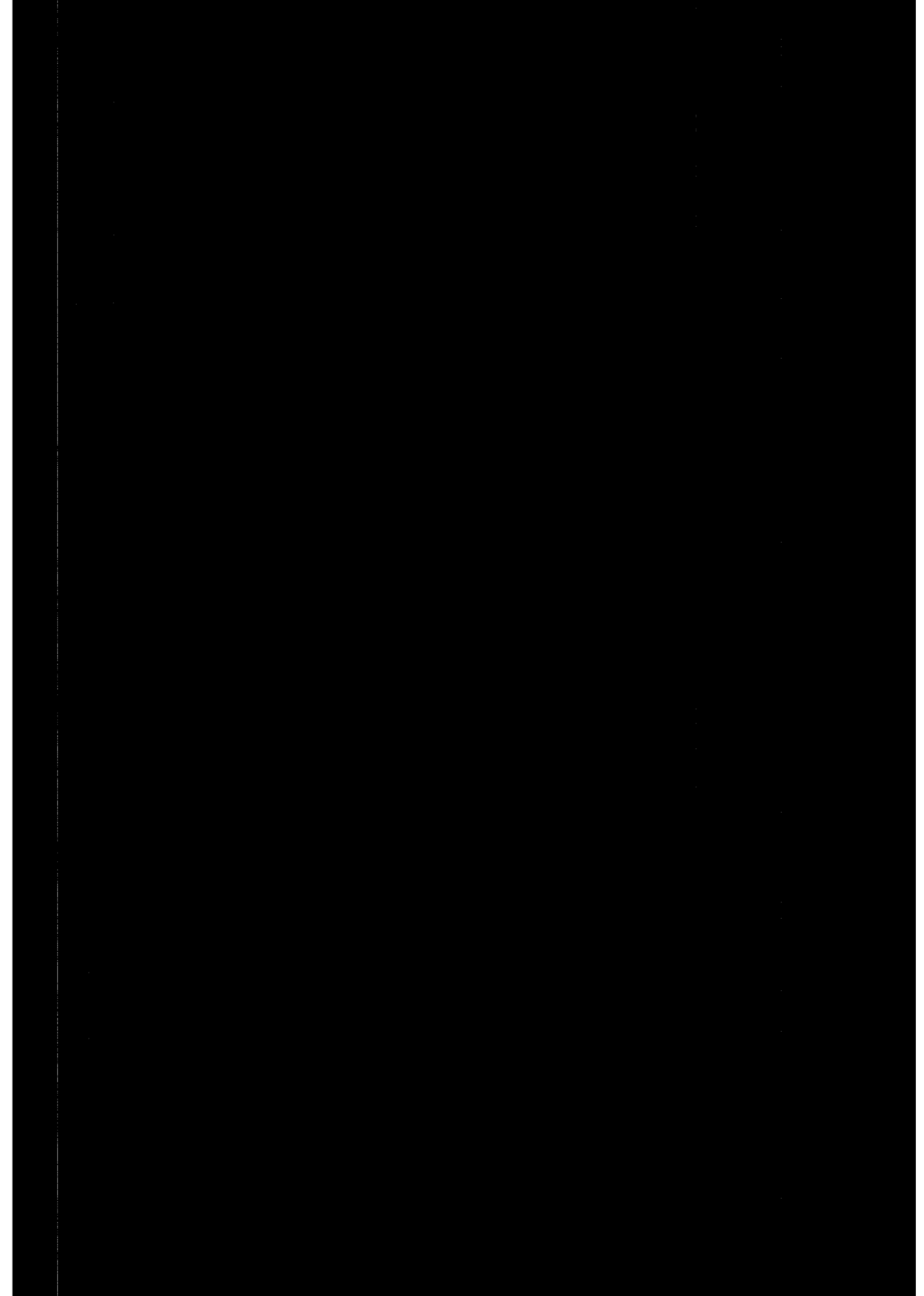

The amount of emulsifier needed in the respective phases will depend on a variety of factors and particularly on the HLB values of the emulsifiers and the choice of oil, and it it estimated that from 2.5 to 15% by volume of the oil phase of a lipophilic emulsifier and from 1.0 to 10% by volume of the aqueous phase of a hydrophilic emulsifier in the respective phases will provide vaccines of the properties described herein. Considerable enhancement of the antigenicity of Clostridial antigens has been obtained using from 5 to 12% by volume of the oil phase and from 3 to 7% by volume of the water phase, of the respective emulsifiers.

The emulsion stability of vaccines of the present invention was tested by maintaining them at room temperature (about 16°), 37° and 50° Celsius. Vaccines maintained at room temperature showed no signs of deterioration or instability of the emulsion after storage for two years. Those maintained at 37° generally maintained a stable emulsion for about 3 or 4 months but some "broke" after 2 months storage. The emulsion of vaccines maintained at 50° generally "broke" after 1 month storage.

Examples of the preparation of vaccines made according to the present invention are described at the end of this specification. The antigenicity of these vaccines was compared with vaccines containing a Freund-type emulsion of the same antigens.

The Pulpy Kidney vaccine described in Example 1 was compared with a Pulpy Kidney vaccine prepared by emulsifying 70 ml. oil phase (consisting of 10% v./v. Arlacel A in Bayol F) with 30 ml. diluted Clostridium perfringens Type D toxoided filtrate so that the concentration of epsilon-toxoid in final emulsion was 30 international units/ml. Each of these vaccines was used to immunise groups of rabbits, each animal receiving a single subcutaneous dose of 1 ml. of one vaccine. After 1 month the rabbits were bled and the sera pooled. The epsilon antitoxin titre of the vaccine of Example 1 was 15 international units/ml. and that of the Freund-type vaccine 4.8 international units/ml.

The concentrated multicomponent vaccines described in Examples 5 to 8 were compared with a Freund-type vaccine containing the same concentration of the same antigens and prepared by emulsifying 80 parts of an oil phase (consisting of 15% v./v. Arlacel A and 5% v./v. Falba in Bayol F) with 20 parts of a blend of concentrated toxoids of *Clostridium perfringens* Types B, C and D, *Clostridium septicum*, *Clostridium oedematiens* Type B, and *Clostridium tetani*, and a concentrated anaculture of *Clostridium chauvoei*. These vaccines were injected into rabbits and guinea pigs, each animal receiving two subcutaneous doses of 1 ml. with 28 days separating the second from the first injection. Antibody titres were obtained by testing pooled samples of serum obtained from the animals 12–14 days after the second injection. The antigenicity of the *Clostridium chauvoei* component was measured by challenging groups of immunised guinea pigs with a virulent culture of *Clostridium chauvoei* 14 days after the second injection. The results are shown in Table I from which it is seen that a much higher antibody response or greater protection was obtained with vaccines of the present invention than with the Freund-type vaccine.

The unconcentrated multicomponent vaccines described in Examples 9 to 11 were also compared with a Freund-type vaccine containing the same concentration of the same antigens and prepared by emulsifying 70 parts oil phase (consisting of 10% v./v. Arlacel A in Bayol F) with 30 parts of unconcentrated filtrates of toxoids of *Clostridium perfringens* Type D and *Clostridium septicum*, unconcentrated anacultures of *Clostridium perfringens* Types B and C, *Clostridium oedematiens* Type B and *Clostridium chauvoei*, and concentrated tetanus toxoid. The antigenicity of the above vaccine and those described in Examples 9 to 11 were tested in the manner described above for the multicomponent concentrated vaccines. The results given in Table II show that each of the vaccines made according to the present invention stimulated a greater antibody titre or provided greater protection than the Freund-type vaccine.

TABLE I.—THE RESPONSE OF RABBITS AND GUINEA PIGS TO CONCENTRATED MULTICOMPONENT CLOSTRIDIAL VACCINES

| | Serum titres in International Units per ml. | | | | | | | | | | |
|---|---|---|---|---|---|---|---|---|---|---|---|
| | *Clostridium perfringens* | | | | *Clostridium tetani* antitoxin | | *Clostridium oedematiens* Type B alpha antitoxin | | *Clostridium septicum* antitoxin | | Total number of survivors out of 6 guinea pigs challenged with *Cl. chauvoe* |
| | Beta antitoxin | | Epsilon antitoxin | | | | | | | | |
| Vaccine | Rabbit | Guinea pig | Rabbit | Guinea pig | Rabbit | Guinea pig | Rabbit | Guinea pig | Rabbit | Guinea pig | |
| Freund-type | 21 | 63 | 30–45 | 20–30 | 20 | 45–70 | 10–20 | 100–200 | 2–5 | 2.3 | 2 |
| Example 5 | 85 | 210 | 45–70 | 45–70 | 70–100 | 150 | 50–100 | 200–500 | 42.5 | 7.5 | 5 |
| Example 6 | 95 | 135 | 70–100 | 30 | 45–70 | 100–150 | 100 | 200–500 | 28.5 | 4.5 | 6 |
| Example 7 | 127 | 190 | 100–150 | 15–20 | 70 | 100 | 100 | 100–200 | 38 | 2.9 | 6 |
| Example 8 | 48 | 142 | 45–70 | 20–30 | 70 | 100–150 | 10–20 | 200–500 | 14.3 | 6.9 | 6 |

TABLE II.—THE RESPONSE OF RABBITS AND GUINEA PIGS TO UNCONCENTRATED MULTICOMPONENT CLOSTRIDIAL VACCINES

| | Serum titres in International Units per ml. | | | | | | | | | | |
|---|---|---|---|---|---|---|---|---|---|---|---|
| | *Clostridium perfringens* | | | | *Clostridium tetani* antitoxin | | *Clostridium oedematiens* Type B alpha antitoxin | | *Clostridium septicum* antitoxin | | Total number of survivors out of 6 guinea pigs challenged with *Cl. chauvoei* |
| | Beta antitoxin | | Epsilon antitoxin | | | | | | | | |
| Vaccine | Rabbit | Guinea pig | Rabbit | Guinea pig | Rabbit | Guinea pig | Rabbit | Guinea pig | Rabbit | Guinea pig | |
| Freund-type | 9.5 | 31.5 | 30–45 | 4.5 | 30 | 150 | 2 | 20–50 | 4.0 | 0.63 | 5 |
| Example 9 | 32 | 58 | 70–100 | 15–20 | 45 | 70–100 | 10–20 | 100 | 9.5 | 1.7 | 6 |
| Example 10 | 34.5 | 57.5 | 45–70 | 10–15 | 45 | 100–150 | 10–20 | 100 | 15.8 | 1.3 | 6 |
| Example 11 | 34.5 | 53 | 30–45 | 20–30 | 20–30 | 45 | 5–10 | 20–50 | 7.5 | 1.7 | 6 |

The following are examples of the invention in which all parts are by volume. A preservative of sodium ethylmercurithiosalicylate (Thiomeral) was included in a con-

EXAMPLES 9–11

Unconcentrated multicomponent vaccines

Unconcentrated anacultures of *Clostridium perfringens* Types B and C were prepared in the manner described in Example 2 except that the culture was not filtered. Unconcentrated toxoid of *Clostridium septicum* was prepared in the manner described in Example 3 except that the culture was not concentrated. An unconcentrated anaculture of *Clostridium oedematiens* was prepared by the procedure described in Examples 5–8 except that the culture was not filtered or concentrated.

A blend (28.5 parts) of concentrated tetanus toxoid (as prepared in Example 4), unconcentrated filtered toxoids of *Clostridium perfringens* Type D (as prepared in Example 1), unconcentrated filtered toxoid of *Clostridium septicum*, and unconcentrated anacultures of *Clostridium perfringens* Types B and C and of *Clostridium oedematiens* Type B, was mixed with 1.5 parts of a hydrophilic emulsifier indicated below, and the whole of this aqueous phase divided into 3 portions. Each portion was then mixed in the manner described in preceding examples with an oil phase comprising 63 parts of Bayol F and 7 parts of Arlacel A to produce an emulsion.

| Example: | Aqueous phase emulsifier |
|---|---|
| 9 | Tween 80 |
| 10 | Tween 85 |
| 11 | Tween 20 |

These vaccines satisfied the requirements of the British Veterinary Codex (and the British Pharmacopoeia in respect of the tetanus component) with regard to safety, sterility and freedom from abnormal toxicity.

EXAMPLES 12 AND 13

Unconcentrated multicomponent vaccines

Unconcentrated anacultures of *Clostridium perfringens* Types B and C were prepared in the manner described in Example 2 except that the culture was not filtered. Unconcentrated toxoid of *Clostridium septicum* was prepared in the manner described in Example 3 except that the culture was not concentrated. An unconcentrated anaculture of *Clostridium oedematiens* was prepared by the procedure described in Examples 5–8 except that the culture was not filtered or concentrated.

A blend ($x$ parts) of concentrated tetanus toxoid (as prepared in Example 4), unconcentrated filtered toxoids of *Clostridium perfringens* Type D (as prepared in Example 1), unconcentrated filtered toxoid of *Clostridium septicum*, and unconcentrated anacultures of *Clostridium perfringens* Types B and C and of *Clostridium oedematiens* Type B, was mixed with $y$ parts of a hydrophilic emulsifier indicated below, and the whole of this aqueous phase divided into 2 portions. Each portion was then mixed in the manner described in preceding examples, with an oil phase comprising 63 parts of Bayol F and 7 parts of Arlacel A.

| Example | Hydrophilic emulsifier, $y$ parts | Antigenic blend, $x$ parts |
|---|---|---|
| 2 | 1.5 parts G 2127 | 28.5 parts. |
| 3 | 0.3 part Tween 80 | 29.7 parts. |

Each of these vaccines were injected into rabbits and guinea pigs, each animal receiving two subcutaneous doses of 2 ml. at a three week interval. Antibody titres were obtained by testing pooled samples of serum obtained from the animals 21 days after the second injection. The antigenicity of the *Clostridium chauvoei* component was measured by challenging groups of immunised guinea pigs with a virulent culture of *Clostridium chauvoei* 14 days after the second injection. The results are shown in Table III.

These vaccines satisfied the requirements of the British Veterinary Codex (and the British Pharmacopoeia in respect of the tetanus component) with regard to safety, sterility and freedom from abnormal toxicity.

TABLE III.—THE RESPONSE OF RABBITS AND GUINEA PIGS TO UNCONCENTRATED MULTICOMPONENT CLOSTRIDIAL VACCINES

| | Serum titres in International Units per ml. | | | | | | | | | | |
|---|---|---|---|---|---|---|---|---|---|---|---|
| | *Clostridium perfringens* | | | | *Clostridium tetani* antitoxin | | *Clostridium oedematiens* Type B alpha antitoxin | | *Clostridium septicum* antitoxin | | Total number of survivors out of 6 guinea pigs challenged with *Cl. chauvoei* |
| | Beta antitoxin | | Epsilon antitoxin | | | | | | | | |
| Vaccine | Rabbit | Guinea pig | Rabbit | Guinea pig | Rabbit | Guinea pig | Rabbit | Guinea pig | Rabbit | Guinea pig | |
| Example 12 | 7.5 | 28.5 | 45 | 20–30 | 20–30 | 100–150 | 5–10 | 1–2 | 3.8 | <0.45 | 6 |
| Example 13 | 27 | | 45–70 | | | 70–100 | | 50–100 | 6.25 | | 6 |

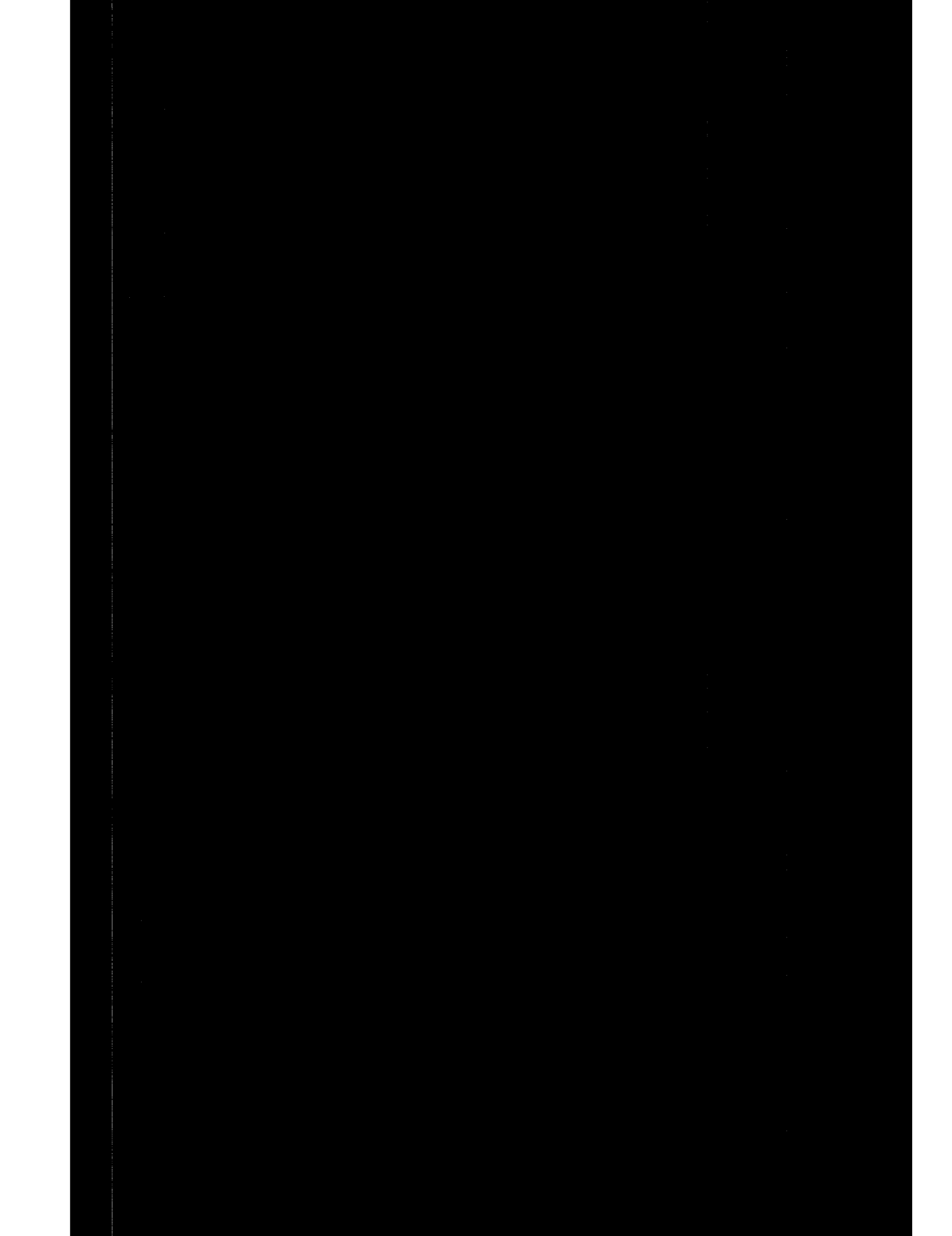

What I claim is:

1. An injectionable sterile, multiple clostridial antigen vaccine preparation, which provides enhanced antibody response without aluminum adjuvant, comprising aqueous antigenic material derived from at least two pathogenic clostridium species, a mineral oil, a non-ionic lipophilic emulsifier having an HLB value of from 2 to 8, and a non-ionic hydrophilic emulsifier having an HLB value of from 9 to 20, the preparation being a stable, parenterally acceptable emulsion of an aqueous antigen phase dispersed in a continuous oil phase, wherein said aqueous phase comprises from 10 to 35% of the volume of the preparation.

2. A vaccine preparation as claimed in claim 1 wherein the hydrophilic emulsifier has an HLB value from 11 to 18 and constitutes from 3 to 7% by volume of the aqueous phase, and the lipophilic emulsifier has an HLB value from 2 to 6 and constitutes 5 to 12% by volume of the oil phase.

3. A vaccine preparation as claimed in claim 1 wherein the hydrophilic emulsifier is a polyoxyethylene derivative of a hexitol fatty acid and the lipophilic emulsifier is an ester of a fatty acid with a hexitol anhydride.

4. A vaccine preparation as claimed in claim 1 wherein the hydrophilic emulsifier is selected from the class consisting of polyoxyethylene (20) sorbitan monooleate and polyoxyethylene (20) sorbitan trioleate, and the lipophilic emulsifier is selected from the class consisting of mannide monooleate and sorbitan monooleate.

5. A vaccine preparation as claimed in claim 1 wherein the antigenic material is derived from at least two species of the class consisting of *Cl. oedematiens*, *Cl. septicum*, *Cl. chauvoei*, *Cl. tetani*, *Cl. perfringens* Type B, *Cl. perfringens* Type C, and *Cl. perfringens* Type D.

6. A method for the prophylaxis of clostridial diseases in sheep and cattle comprising the administration by intraperitoneal or subcutaneous injection of a vaccine claimed in claim 1.

7. A vaccine preparation as claimed in claim 1, wherein the antigenic material is derived from the organisms *Cl. perfringens* Type B, *Cl. perfringens* Type C, and *Cl. perfringens* Type D.

8. A vaccine preparation as claimed in claim 1, wherein the antigenic material is derived from the organisms *Cl. perfringens* Type D, *Cl. septicum*, *Cl. chauvoei* and *Cl. tetani*.

9. A vaccine preparation as claimed in claim 1, wherein the antigenic material is derived from the organisms